(12) United States Patent
Chen

(10) Patent No.: US 11,440,817 B2
(45) Date of Patent: Sep. 13, 2022

(54) STERILIZER FOR AQUARIUM

(71) Applicant: Chi-Der Chen, Taipei (TW)

(72) Inventor: Chi-Der Chen, Taipei (TW)

( * ) Notice: Subject to any disclaimer, the term of this patent is extended or adjusted under 35 U.S.C. 154(b) by 302 days.

(21) Appl. No.: 16/872,440

(22) Filed: May 12, 2020

(65) Prior Publication Data

US 2021/0354999 A1    Nov. 18, 2021

(51) Int. Cl.
| | |
|---|---|
| *C02F 1/32* | (2006.01) |
| *A01K 63/04* | (2006.01) |
| *C02F 1/00* | (2006.01) |
| *C02F 1/28* | (2006.01) |
| *C02F 1/40* | (2006.01) |

(52) U.S. Cl.
CPC ............ *C02F 1/325* (2013.01); *A01K 63/045* (2013.01); *A01K 63/047* (2013.01); *C02F 1/001* (2013.01); *C02F 1/286* (2013.01); *C02F 1/40* (2013.01); *C02F 2201/3227* (2013.01); *C02F 2201/3228* (2013.01); *C02F 2303/04* (2013.01)

(58) Field of Classification Search
CPC .......... C02F 1/325; C02F 1/001; C02F 1/286; C02F 1/40; C02F 2201/3227; C02F 2201/3228; C02F 2303/04; A01K 63/045; A01K 63/047
USPC ...... 210/167.21, 416.1, 416.2, 748.1, 748.11
See application file for complete search history.

(56) References Cited

U.S. PATENT DOCUMENTS

| | | | | |
|---|---|---|---|---|
| 3,683,177 A | * | 8/1972 | Veloz ..................... A61L 2/10 | |
| | | | | 119/245 |
| 4,297,222 A | * | 10/1981 | Takeguchi ............. A01K 63/04 | |
| | | | | 210/615 |
| 5,026,477 A | * | 6/1991 | Yen ........................ C02F 9/005 | |
| | | | | 210/167.25 |
| 5,054,424 A | * | 10/1991 | Sy ........................ A01K 63/045 | |
| | | | | 119/260 |
| 5,567,315 A | * | 10/1996 | Weidenmann ....... A01K 63/045 | |
| | | | | 210/123 |
| 7,488,417 B2 | * | 2/2009 | Chauquet ............. A01K 63/045 | |
| | | | | 210/167.25 |
| 2009/0001027 A1 | * | 1/2009 | Carew ................... B01D 29/15 | |
| | | | | 210/416.1 |

FOREIGN PATENT DOCUMENTS

| | | | | |
|---|---|---|---|---|
| CN | 112772539 A | * | 5/2021 | |
| KR | 100383035 B1 | * | 5/2003 | |
| KR | 200347607 Y1 | * | 4/2004 | |
| KR | 101398624 B1 | * | 7/2014 | |
| WO | WO 2007021755 A1 | * | 2/2017 | |

* cited by examiner

*Primary Examiner* — Fred Prince

(74) *Attorney, Agent, or Firm* — Bradley J. Thorson; DeWitt LLP

(57) ABSTRACT

A sterilizer for an aquarium includes a pump for sucking water in an aquarium and a filtering member for filtering the water. The pump includes an inlet from which the water in the aquarium is sucked. The filtering member is connected to the underside of the pump and includes an outlet through which the filtered water flows back into the aquarium. Multiple reflectors are connected to the periphery of the filtering member, and a coat is mounted to outside of the filtering member and covers the reflectors. Multiple ultraviolet sterilizer bulbs are located in the filtering member so as to treat the water sucked from the pump. A cotton sleeve is mounted to the pump and located around the inlet to remove debris and grease.

2 Claims, 4 Drawing Sheets

STERILIZER FOR AQUARIUM

BACKGROUND OF THE INVENTION

1. Fields of the Invention

The present invention relates to a sterilizer used for an aquarium to efficiently treat and circulate the water of aquarium, and more particularly, to an ultraviolet sterilizer lamp installed in a filtering member to sterilize the water.

2. Descriptions of Related Art

The conventional aquarium generally is equipped with at least one ultraviolet sterilizer lamp so as to sterilize germs in the water to protect the plants and fishes in the water. The ultraviolet sterilizer lamp is located in the position where water flows. However, it is noted that the conventional ultraviolet sterilizer lamp cannot efficiently sterilize the water passing by within a short period of time.

The present invention intends to provide a sterilizer in an aquarium to eliminate the shortcomings mentioned above.

SUMMARY OF THE INVENTION

The present invention relates to a sterilizer for an aquarium and comprises a pump for sucking water in an aquarium, and the pump includes an inlet from which the water in the aquarium is sucked into the pump. A filtering member is connected to the underside of the pump and has an outlet defined radially therein. Multiple reflectors are connected to the periphery of the filtering member. A coat is mounted to outside of the filtering member and covers the reflectors. Multiple ultraviolet sterilizer bulbs are located in the filtering member and connected with a power source. A cotton sleeve is mounted to the pump and located around the inlet to remove debris and grease. The water sucked into the filtering member is filtered and treated by the ultraviolet sterilizer bulbs.

Preferably, the reflectors each are an angled plate or a planar plate.

The primary object of the present invention is to provide a sterilizer for an aquarium, wherein the pump sucks the water into the filtering member to be treated by the ultraviolet sterilizer bulbs, and the treated water flows back into the aquarium from the outlet of the filtering member. The present invention is able to treat significant amount water.

The reflectors ensure that the water is completely treated by the ultraviolet sterilizer bulbs.

The cotton sleeve mounted to the pump and located next to the inlet to remove debris such as algae and grease from the water sucked into the filtering member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
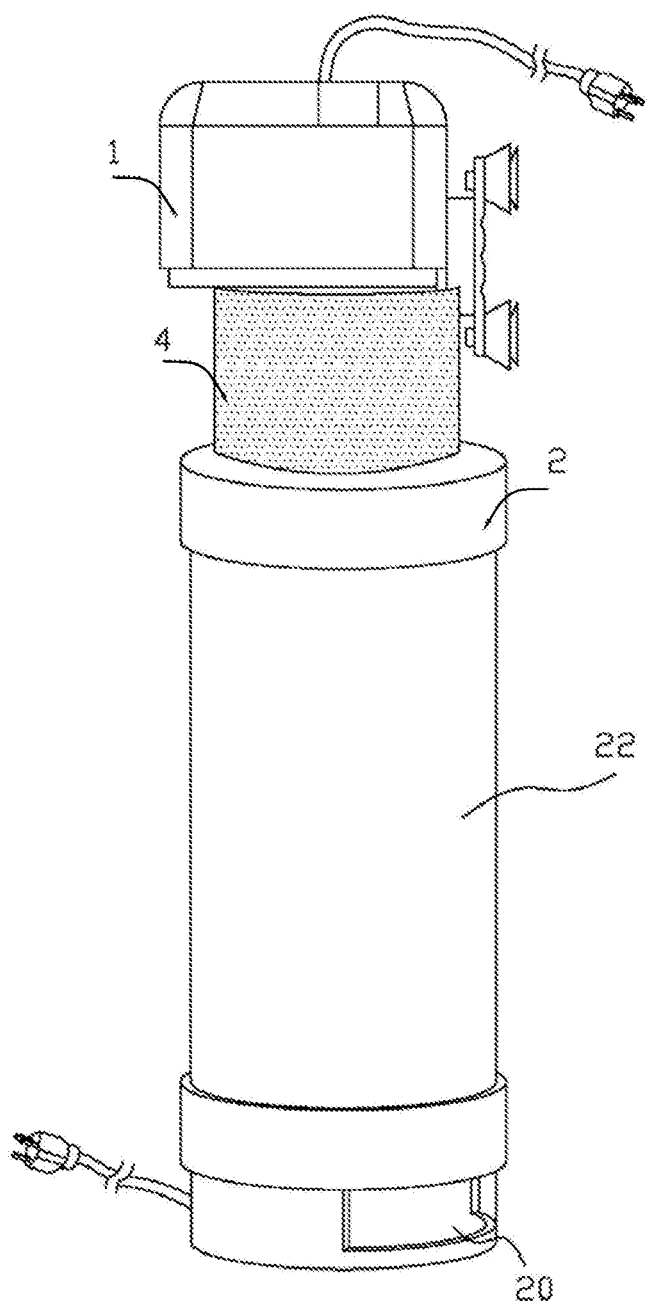
FIG. 1 shows the sterilizer for an aquarium of the present invention.
Figure 2:
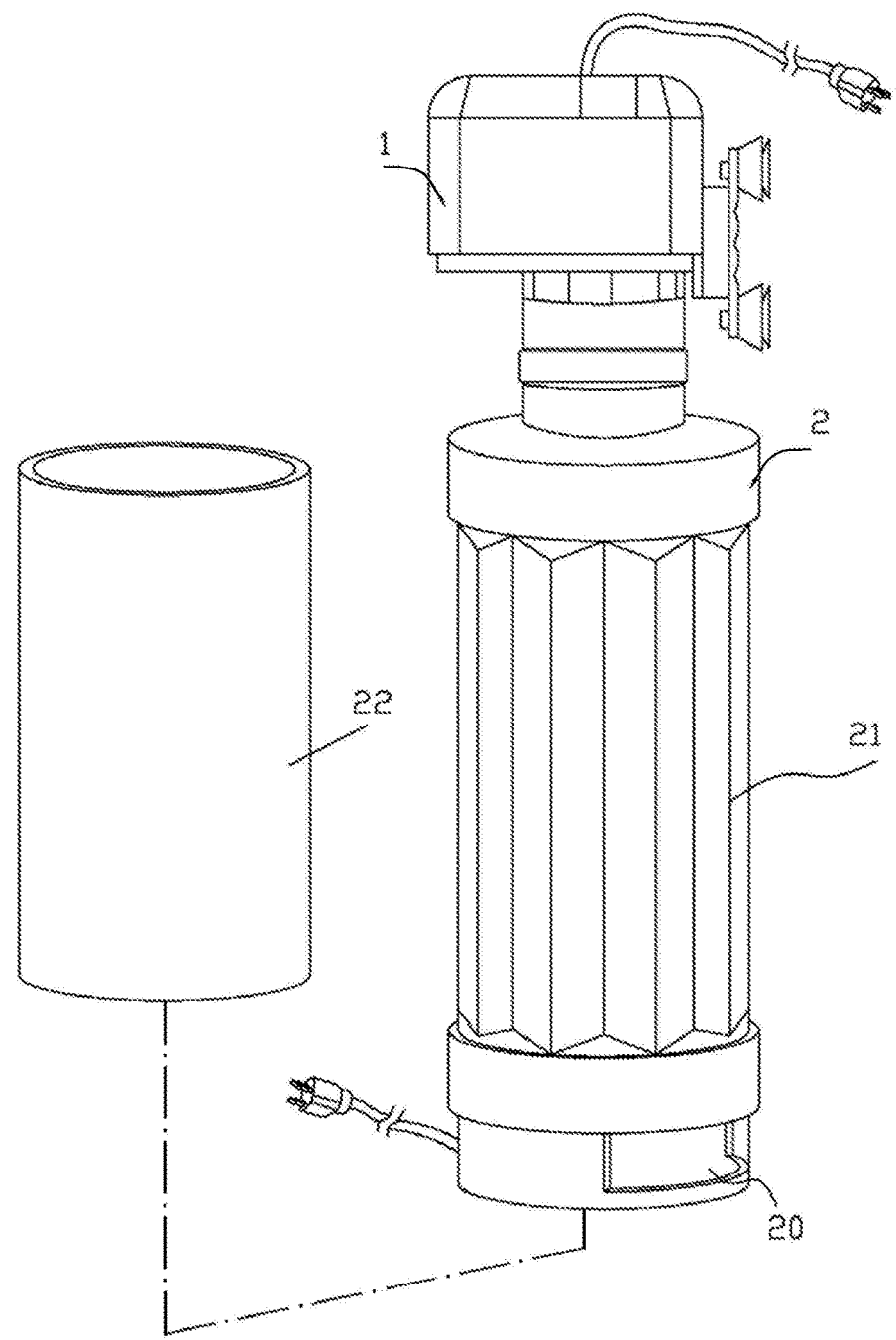
FIG. 2 is an exploded view of the sterilizer for an aquarium of the present invention.
Figure 3:
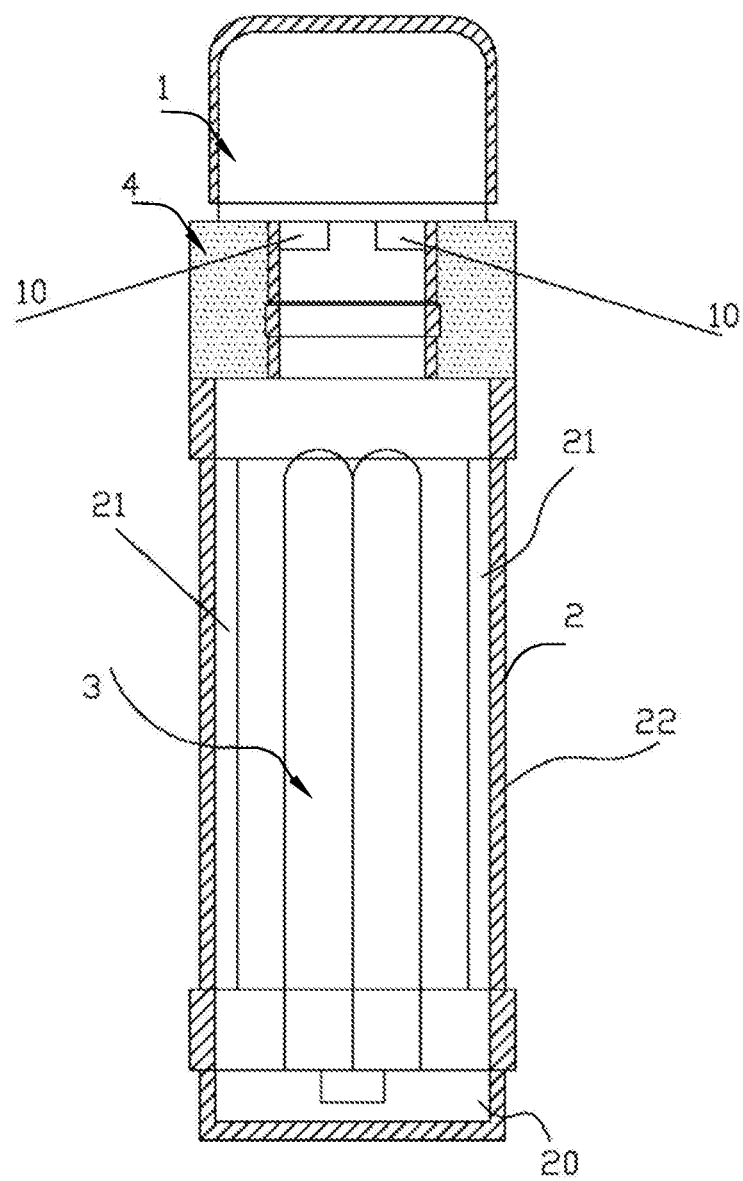
FIG. 3 is a cross sectional view of the sterilizer for an aquarium of the present invention.

Referring to FIGS. 1 to 3, the sterilizer for an aquarium of the present invention comprises a pump 1, a filtering member 2, multiple ultraviolet sterilizer bulbs 3, and cotton sleeve 4. The pump 1 includes an inlet 10 defined in the top portion thereof so as to suck the water in the aquarium. The filtering member 2 includes an outlet 20 defined radially in the lower portion thereof. Therefore, the water sucked from the inlet 10 of the pump 1 and the water flows back into the aquarium from the outlet 20.

The filtering member 2 is connected to the underside of the pump 1, and the multiple reflectors 21 are connected to the periphery of the filtering member 2 and connected with a power source from the underside of the filtering member 2. A coat 22 is mounted to outside of the filtering member 2 and covers the reflectors 21. The cotton sleeve 4 is a tubular sleeve and mounted to the pump 1 and located close to the inlet 10 to remove debris such as algae and grease from the water to be sucked by the pump 1.

Figure 4:
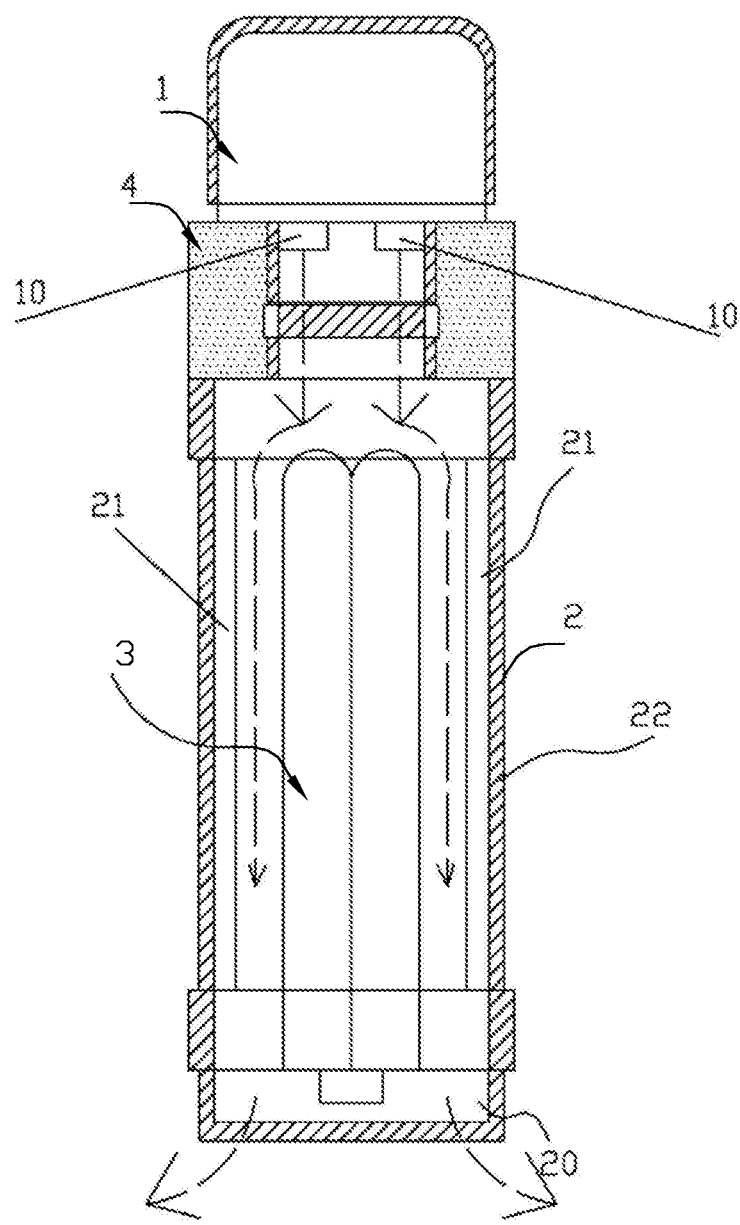
FIG. 4 is a cross sectional view to show the water is circulated and treated by the sterilizer for an aquarium of the present invention.

As shown in FIG. 4, the water is sucked from the inlet 10 of the pump 1 and flows back into the aquarium from the outlet 20 of the filtering member 2. The arrangement of the inlet 10 located above the outlet 20 can quickly suck a significant amount of water. The multiple ultraviolet sterilizer bulbs 3 are located in the filtering member 2 and sterilize the water. The reflectors 21 each are an angled plate or a planar plate so as to reflect the ultraviolet ray to ensure that the water is completely treated.

The present invention is able to treat the water efficiently by the ultraviolet ray from the multiple ultraviolet sterilizer bulbs 3. The debris such as algae and grease can be removed from the water to be sucked by the pump 1 by the cotton sleeve 4 to protect the pump 1.

While we have shown and described the embodiment in accordance with the present invention, it should be clear to those skilled in the art that further embodiments may be made without departing from the scope of the present invention.

What is claimed is:

1. A sterilizer for an aquarium, comprising:
   a pump for sucking water in an aquarium, the pump having an inlet so as to suck the water in the aquarium into the pump;
   a filtering member connected to an underside of the pump and having an outlet defined radially therein, multiple reflectors connected to a periphery of the filtering member, a coat mounted to outside of the filtering member and covering the reflectors;
   multiple ultraviolet sterilizer bulbs located in the filtering member and connected with a power source from an underside of the filtering member to sterilize the water and
   a cotton sleeve mounted to the pump and located around the inlet to remove debris and grease.

2. The sterilizer as claimed in claim 1, wherein the reflectors each are an angled plate or a planar plate.

* * * * *